US006937450B1

(12) United States Patent

Mayer et al.

(10) Patent No.: US 6,937,450 B1

(45) Date of Patent: Aug. 30, 2005

(54) GROUNDED ISOLATION SYSTEM

(75) Inventors: William J. Mayer, Hales Corners, WI (US); Douglas Cleereman, Greendale, WI (US); David Fisher, Brookfield, WI (US); Milan Damjanovich, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/407,475

(22) Filed: Sep. 28, 1999

(51) Int. Cl.[7] .................................... H02H 9/08

(52) U.S. Cl. .................................... 361/42; 361/43

(58) Field of Search .................... 361/42, 166, 31, 361/33, 160, 187, 189, 48, 50, 43, 44, 45, 361/46, 47, 49, 170

(56) References Cited

U.S. PATENT DOCUMENTS 3,249,820 A * 5/1966 Stimmel .................... 361/189
3,895,264 A * 7/1975 Kirilloff .................... 361/48
4,368,498 A * 1/1983 Neuhouser .................... 361/48
4,375,660 A * 3/1983 Tate et al. .................... 361/50
4,415,850 A * 11/1983 Sherwood .................... 324/509
4,737,603 A * 4/1988 Lycan .................... 200/18
4,897,606 A * 1/1990 Cook et al. .................... 324/509
5,281,857 A * 1/1994 Keese .................... 307/115
5,514,915 A * 5/1996 Kim et al. .................... 307/64
5,537,283 A * 7/1996 Keese .................... 361/42
5,689,398 A 11/1997 Miller et al.
5,896,289 A * 4/1999 Struger .................... 700/9
6,108,179 A * 8/2000 Katae et al. .................... 361/31
6,301,091 B1 * 10/2001 Zomchek et al. ........... 361/189
6,437,951 B1 * 8/2002 Ahlstrom et al. ............. 361/42

* cited by examiner

*Primary Examiner*—Stephen W. Jackson
*Assistant Examiner*—Danny Nguyen
(74) *Attorney, Agent, or Firm*—Quarles & Brady LLP; Alexander M. Gerasimow

(57) ABSTRACT

A system for electrically isolating and indicating electrical isolation of a machine including a plurality of relays which cooperate to, when electrical isolation is selected, ground voltage input lines to the machine thereby ensuring that no power is provided to the machine during operator access thereto.

18 Claims, 5 Drawing Sheets

GROUNDED ISOLATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to isolation systems for electrically isolating access points on a machine and more particularly relates to an isolation configuration which uses safety relays and switches which redundantly isolate and ground an electrical system during lock-out conditions.

An exemplary automated manufacturing line may include several hundred electrically powered devices arranged in device sets at separate manufacturing stations, a separate manufacturing process performed by each device at each station. For example, the devices may include robots, drills, mills, transfer lines, clamps, mixing machines, stuffing machines, drying machines and so on, each of which is linked to one or more loads such as motors for driving the devices through required movements and processes.

While the inventive configuration is meant to be used with many different line arrangements and device groupings, to simplify the present explanation the invention will be described in the context of an exemplary assembly line 300 for, referring to FIG. 4, manufacturing widgets wherein the line includes devices arranged at ten consecutive stations 302, 304, 306, 308, 310, 312, 314, 316, 318 and 320 and wherein each station includes a plurality of devices (not separately illustrated) which cooperate to perform a complete process. A conveyor 322 or other mechanism powered by a motor 321 moves work items (not illustrated) from one station to the next. In many cases a conveyor will be 3000 or more feet long and may require more than a single motor to facilitate conveyance. In addition, as is standard in the industry, a single master controller including a master control panel 324 is provided to control and monitor the entire manufacturing process. To this end, panel 324 includes, among other things, miscellaneous controls 350 and a master or main disconnect 334. The master control panel 324 is provided to control voltages on supply lines 326 which pass through the controller and run along the entire packaging line to each of stations 302 through 320 and to a variable frequency drive (VFD) 328 which controls motor 321. To control station power, disconnect 334 links lines 326 to station controls 330.

When designing a manufacturing or processing line one of the primary considerations is line safety as many of the devices at each line station may inflict injury to an operator in the station vicinity. Typical injuries including mechanical injury (e.g., falling, crushing, puncture, etc.). For this reason many stations, and in some cases all stations, will be enclosed in a housing assembly to ensure that an operator does not inadvertently enter a potentially hazardous station environment. Hereinafter an exemplary enclosure will be referred to as a station and the station or device grouping therein will sometimes be referred to as a hazard to indicate the potential danger associated therewith.

Despite painstaking design of the processing line stations and of the control method associated therewith, often processing problems can occur which require operator intervention to alleviate the problems. For example, in the case of the exemplary processing line described above, assume that a riveting station 302 or hazard is set up to fire rivets into work items as the items are transferred therethrough. If a work item becomes jammed between station devices the item may cause a backlog of work items at the station and, possibly cause additional jamming. In this case, to eliminate the jamb, an operator would have to enter station 302 and physically remove the jamb.

To facilitate operator intervention, typically line access points are provided. In the present example, it will be assumed that a cage is formed about riveting station 302 and that an opening there into is formed in the cage.

To ensure that an operator entering a station via an access point is not injured, standard practice within the industry requires that power to the station be entirely cut off via a power down mechanism. By cutting off power to the station, all station devices cease mechanical movement and the possibility of injury is essentially eliminated.

Referring still to FIG. 4, primitive and still prevalent power down mechanisms include a master or main disconnect switch 334 linked to the master control panel. To cut power, switch 334 is tripped which causes power to the entire line to shut down. Because the master control panel 324 is often remote (e.g., perhaps 3000 feet) from some line stations, it is always possible that a second operator may reclose disconnect switch 324 while a first operator is within a station thereby causing a potential hazard. To eliminate this possibility the industry has configured standard lockout disconnect switches and has devised standard lockout-tag out procedures. To this end, after a disconnect switch is opened, the switch can be locked in the open position and tagged (i.e., an actual tag is placed on the lock identifying the operator) by the operator who locked the switch to ensure that the switch remains open.

While the master disconnect switch 334 is advantageous, a system including only a master switch 334 is disadvantageous for several reasons. First, as indicated above, typically the switch is located at a master control panel 324 which may be remote from an access point. In this case, once the operator recognizes a problem which requires operator intervention, the operator has to halt line operation, run to the master control panel 324, open the master disconnect switch 334, lock out and tag the switch 334, perform a lockout/tag out power off verification to ensure lockout and tag out, walk back to the problem station 312, access the station 312 to eliminate the problem, walk back to the control panel 324, untag and unlock the disconnect switch 334, close the switch 334 and then start the process once again. While this process may not seem burdensome where a processing line is relatively short (e.g., 10 stations long), this process is extremely burdensome in cases where a line may have many stations which may be up to 3000 or more feet from the master control panel 324 where problems occur routinely (e.g., several times per operator shift).

In addition to being burdensome, this process is also relatively expensive for two reasons. First, employee time is expensive and any process which requires an employee to traverse from one point to another without being productive reduces processing line efficiency. Second, during the time when the line is powered down, output is stalled. The time required to travel to and from the disconnect switch reduces line output. While this may be relatively unimportant in cases where inexpensive products are being processed, down time and the resulting production loss is extremely important where expensive products (e.g., vehicles, etc.) are being manufactured.

Second, the electrical contacts on typical disconnect switches effectively wear out over the course of a relatively short life time. For example, Underwriter's Laboratories mandates 10,000 operations and good disconnect switches last for approximately twenty thousand switching cycles prior to required replacement.

Third, disconnect switches are purposefully designed such that an extremely large force is required to open or close the switch. Such a design substantially reduces the possibility of inadvertent switching. Unfortunately, the required force also places excessive stresses on the disconnect switch mechanical components which often cause mechanical failure (e.g., breakage).

To address the shortcomings of systems which include a single master disconnect switch, the industry has developed a voltage supervision relay (VSR) based system for locally cutting off power to a station thereby electrically isolating the station. To this end, referring to FIG. 1, an exemplary system 10 is illustrated in the context of a station or hazard 12 which is linked to three voltage supply lines L1, L2 and L3. For each hazard 12, system 10 includes an isolation relay, a VSR, a system lockout switch (SLS) 18 and a safety light 20.

SLS 18 includes first and second contacts 22 and 24 which are mutually exclusive (i.e., when one contact 22, 24 is closed, the other 22 or 24 is open and vice versa).

The VSR includes, among other things, voltage sensing and comparison hardware and a VSR coil represented by a VSR block 16 and two normally open (NO) contacts VSR-1 and VSR-2. The isolation contactor includes a coil and positively guided contacts including three NO contacts IC-1, IC-2 and IC-3 and one normally closed (NC) contact IC-4.

Lines L1 and L2 are used to provide power to VSR block 16, coil 14 and light 20. To this end, line L1 forms a voltage rail 26 while line L2 forms a voltage rail 28. Contacts VSR-1 and VSR-2 are in series with SLS contact 22 and safety light 20 between rails 26 and 28. Similarly, SLS contact 24 is in series with coil 14 between rails 26 and 28.

Block 16 is linked between each of contacts IC-1, IC-2 and IC-3 and hazard 12 for sensing voltage thereat. Contact IC-4 is linked to block 16 as an enabling contact. Block 16 only operates when contact IC-4 is closed. After sensing voltages, block 16 compares the sensed voltages to a threshold voltage (e.g., 10 volts) to determine if power is being provided to hazard 12. Where power is provided to hazard 12, current is not provided to the VSR coil and therefore contacts VSR-1 and VSR-2 remain open. Where power is not provided to hazard 12, current is provided to the VSR coil and therefore contacts VSR-1 and VSR-2 both close.

Referring still to FIG. 1, during normal operation, SLS 18 is in an ON position wherein contact 22 is open and contact 24 is closed. In this case current passes through isolation coil 14 so that contacts IC-1, IC-2 and IC-3 are closed and contact IC-4 is open. Because contact 22 is open, light 20 is off.

Next, assuming a process malfunction associated with hazard 12 causes a problem which must be eliminated by an operator, first the operator locally turns off the motor drive. Second, the operator locally (i.e., proximate hazard 10 and the process malfunction) turns SLS 18 from ON to OFF thereby opening contact 24 and closing contact 22. When contact 24 is opened, current to coil 14 is cut off such that contacts IC-1, IC-2 and IC-3 are all opened while contact IC-4 is closed thereby enabling block 16.

Because each of contacts IC-1, IC-2 and IC-3 are all open, VSR block 16 should not sense a voltage above the threshold voltage. On one hand, where the sensed voltages are below the threshold voltage, block 16 energizes the VSR coil and hence closes contacts VSR-1 and VSR-2 causing light 20 to illuminate. Illuminated light 20 indicates that hazard 12 has been electrically isolated and that entry through an associated access point should be safe. After lockout and tag out procedures, the operator can enter hazard 12 to eliminate the problem.

On the other hand, where block 16 senses one or more voltages which are greater than the threshold voltage, block 16 does not energize the VSR coil and hence contacts VSR-1 and VSR-2 remain open despite closed switch 22. In this case, light 20 is not illuminated and the operator knows it is not safe to service hazard 12.

This VSR system works well but has two primary shortcomings. First, VSR block 16 is relatively expensive and increases system costs appreciably over the simple disconnect switch configuration.

Second, the VSR is not field repairable, is difficult to understand and is difficult to trouble shoot.

Therefore, a need exists to provide a safe and relatively inexpensive system for remotely (e.g., locally) electrically isolating machines or processing/manufacturing line hazards. Preferably the such a system would ensure that no current or voltage is provided to a hazard during lockout conditions.

BRIEF SUMMARY OF THE INVENTION

To overcome the shortcomings described above, the present invention includes a method wherein, when electrical isolation for a machine, station or manufacturing line has been selected by a system operator, in addition to disconnecting voltage supply lines from the machine, device, etc., the lines are also linked to a grounding node to ensure that no power is provided. In addition, preferably, the method includes monitoring the ground node to ensure that the ground node remains grounded. Where the lines have been linked to the ground node and the ground node is in fact grounded, an indicator, preferably in the form of a light, indicates a safe device, machine, etc.

Also, preferably, the isolation selection mechanism and indicator corresponding to a specific device, machine, station, etc., is located proximate the station for easy and expedited access.

In addition to the method, the invention also includes an apparatus which is used to perform the method.

Thus, one object of the invention is to provide a machine isolation mechanism which ensures electrical isolation when electrical isolation is selected.

Another object of the invention is to achieve the aforementioned object in a relatively inexpensive manner. To this end, the preferred relay and switching configuration described herein is considered advantageous.

One other object is to ensure that a grounding node is actually grounded thereby further ensuring that no power is provided to a station after electrical isolation has been selected.

Yet another object of the invention is to provide a system which enables local selection of electrical isolation. To this end, a separate isolation selector and indicator can be provided at each of several different stations along a manufacturing line thereby facilitating local isolation.

One other object is to enable single failure detection of a failed contact and require system maintenance when a single failure occurs. The inventive system includes positively guided contactors and relays as well as safety relays which, upon a single open or closed contact failure, electrically isolate the station or stations associated with the failed contact and which will not allow the system which supplies power to the isolated stations(s) to the reset without maintenance to repair the failed contact.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 4:
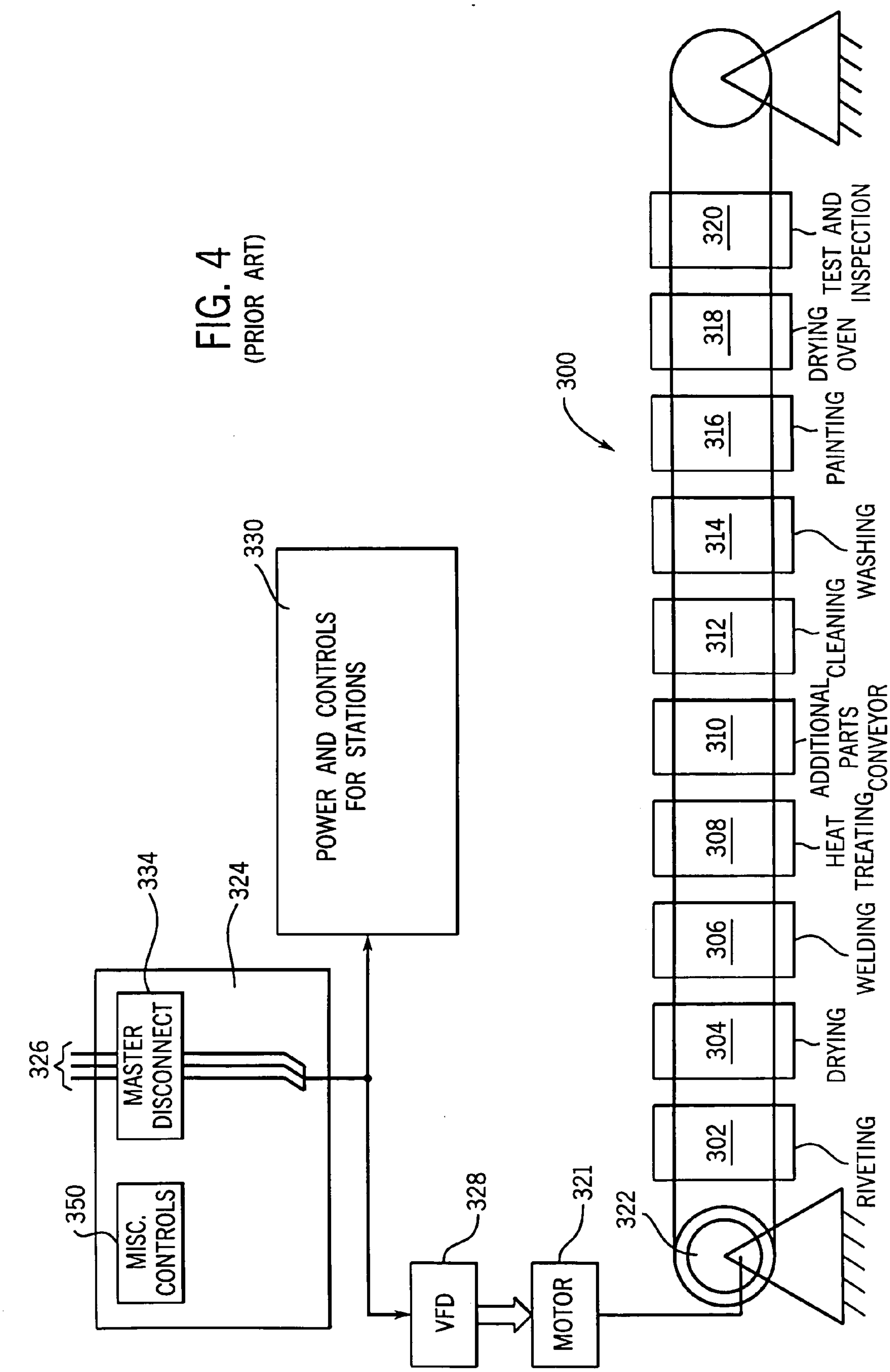
FIG. 4 is a schematic diagram of an exemplary manufacturing line including hardware consistent with prior art disconnect configurations.

Referring now to the drawings and, specifically, referring to FIG. 5, the invention will be described in the context of an exemplary manufacturing line 400 which is similar to line 300 illustrated in FIG. 4, albeit including additional inventive grounding and remote isolation hardware. Line 400 includes ten stations 402, 404, 406, 408, 410, 412, 414, 416, 418 and 420 spaced along the length of a conveyor 422 for performing various sub-processes on work items moved therealong. A motor which drives conveyor 422 is powered by a variable frequency drive 438 or other controls. Power and controls for stations 402 through 420 are collectively identified by numeral 430.

A main or master control panel 424 receives power on three supply lines collectively identified by numeral 326 and provides power to line components which require power. Panel 424 includes miscellaneous panel control 450, a main or master disconnect switch 434 and a ground isolation system (GIS) 452. Main disconnect 434 links supply lines 426 to GIS 452, power provided to GIS 452 via lines L1, L2 and L3. GIS 452 links lines L1, L2 and L3 to each of VFD 438 and controls 430. Collectively VFD 438, controls 430 and hardware controlled thereby is referred to as hazard 52. Thus, hazard 52 includes a manufacturing line which has a plurality of stations, each station having a plurality of different devices which cooperate to perform some tasks on a work item. For example, the devices may include motors, drills, mills, gluing, cooking, riveting, welding, drying, stirring, painting, cleaning, members, etc.

Figure 5:
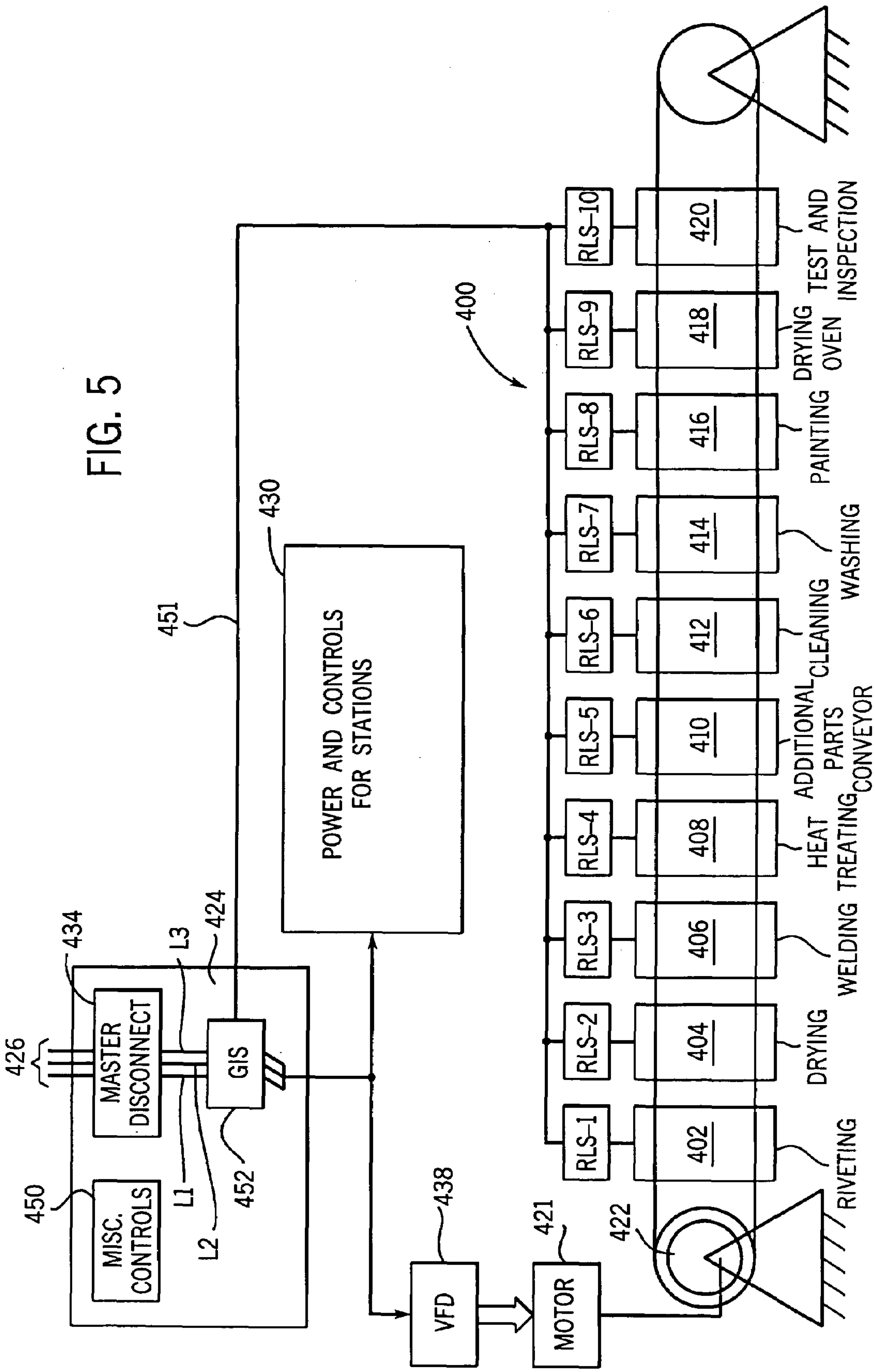
FIG. 5 is a schematic diagram similar to FIG. 4, albeit illustrating a manufacturing line including an inventive disconnect configuration.

Referring still to FIG. 5, each station 402 through 420 includes a station distinct remote lock-out switch (RLS) RLS-1, RLS-2, RLS-3, RLS-4, RLS-5, RLS-6, RLS-7, RLS-8, RLS-9 and RLS-10, respectively. GIS 452 and RLSs 1 through 10 will collectively be referred to as an electrical isolation system 50.

Figure 1:
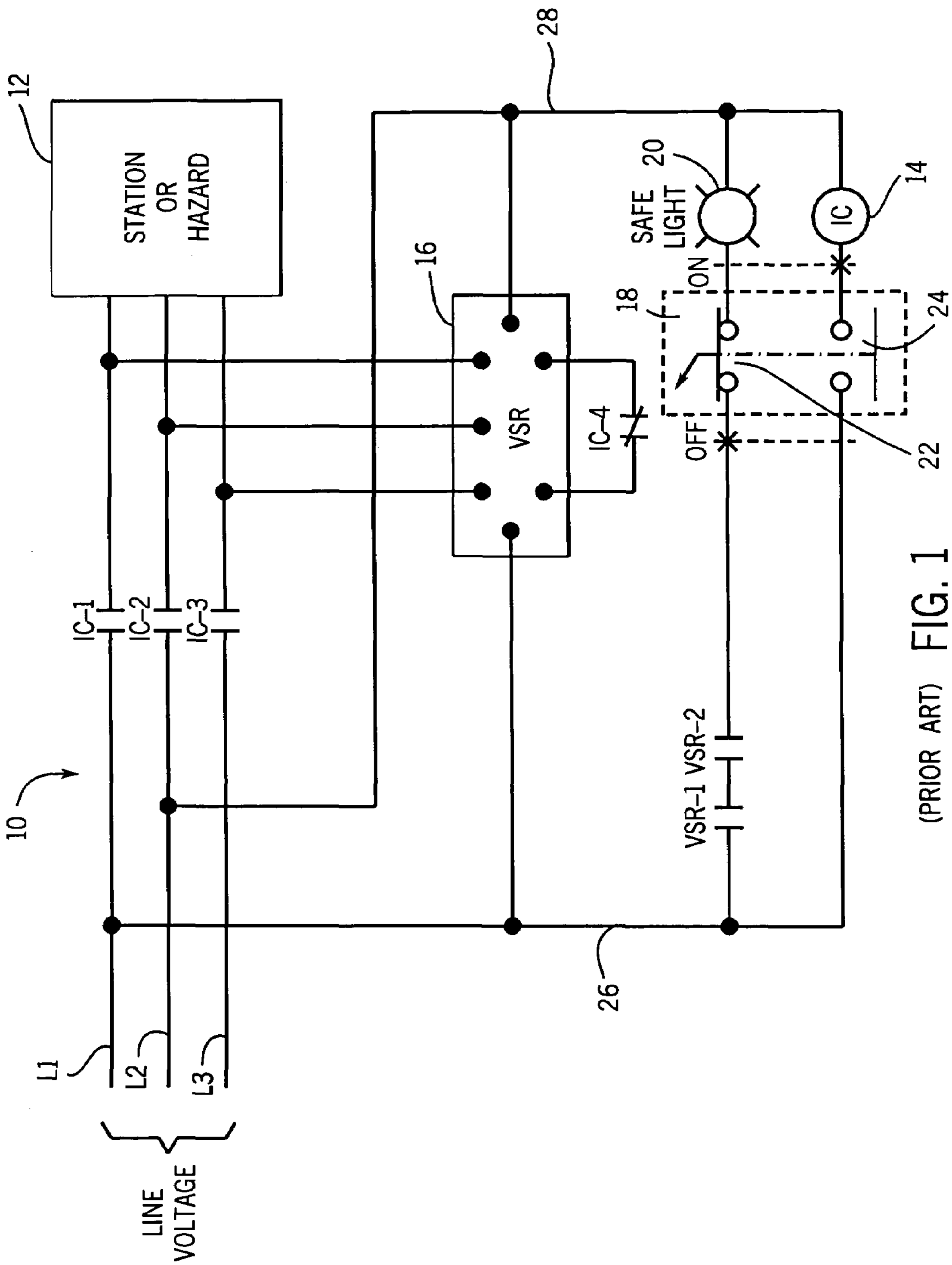
FIG. 1 is a schematic view of a prior art isolation system.
Figure 2:
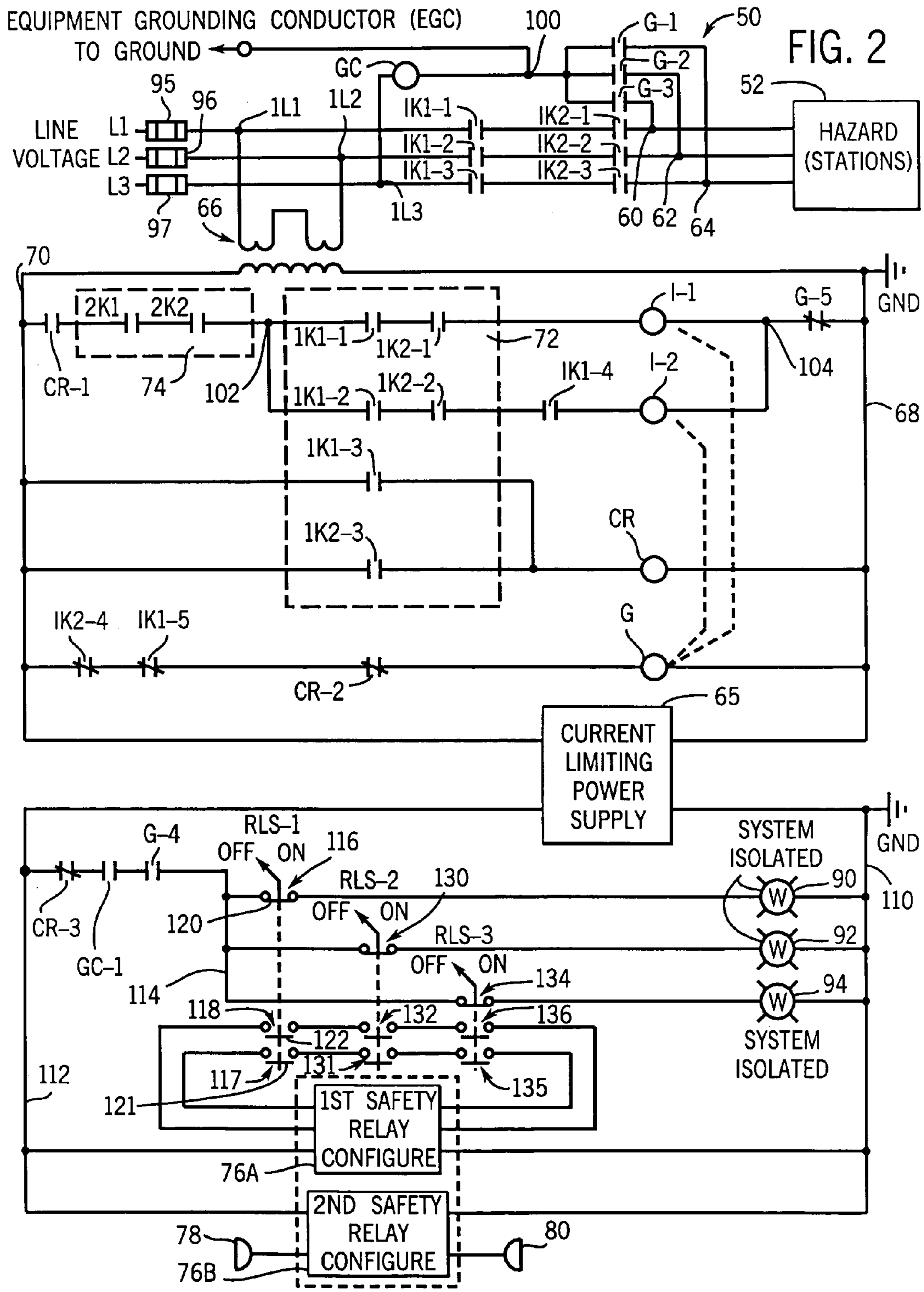
FIG. 2 is a schematic diagram illustrating the inventive isolation system.

Referring now to FIGS. 2 and 5, as described above, hazard 52 is linked via exemplary and inventive isolation system 50 to the three voltage supply lines L1, L2, and L3. When an operator elects to link lines L1, L2 and L3 to intermediate nodes 60, 62 and 64 voltage is provided to hazard 52. Hereafter it will be assumed that a motor at one particular station 402 is for moving a rivet gun into a position to rivet two pieces of sheet metal together.

System Hardware

Electrical isolation system 50 includes a plurality of components which cooperate to enable a user to either provide power to hazard 52 or, in the alternative, to cut off power to hazard 52 and ground intermediate nodes 60, 62 and 64 (see FIG. 2). When nodes 60, 62 and 64 are grounded, an operator may access any of the stations associated with hazard 52 via access locations after a lockout-tagout operation has been performed to ensure that power is not again provided to the specific station. To verify that power at a specific station has been cut off, indicators, preferably in the form of lights (e.g., see 90 in FIG. 2), are provided proximate each access location. When an access location light is lit, it is safe to enter the corresponding station. Similarly, when an access location light is not lit, the inventive system has identified an unsafe condition and the operator should not enter the station.

To facilitate the aforementioned functions, system 50 includes a plurality of relays, switches, fuses and indicator lights. A relay is a device which includes at least one coil and an associated contact. A contact is essentially a two stage switch having a normal state (i.e., open or closed) and an excited state (i.e., the opposite of the normal state). A contact having a normally closed state is referred to as an NC contact while a contact having a normally open state is referred to as an NO contact. When current passes through the coil, the relay changes contact states. Thus, when the coil is energized, the NC contacts open and NO contacts close. In many cases, a relay will include more than a single contact. For example, a relay may include three NO contacts and one NC contact or five NO contacts and one NC contact. In a relay having three NO contacts and one NC contact, when the coil is energized, all three NO contacts close and the NC contact opens. With a relay, when a NO contact is welded closed, corresponding NC contacts cannot close and vice versa. This type of a relay is referred to as a positively guided relay.

As well known in the art, relays can be combined in specific configurations to perform specific tasks. One special type of relay configuration is generally referred to as a safety relay configuration. A safety relay configuration typically includes, among other things, one or more relays, one or more NC emergency stop (ES) switches, a start switch and a logic power source. Typical configurations include both a control circuit or a safety relay circuit and at least one output. The safety relay circuit is designed to effectively "determine" whether or not an operator wants power to be delivered to a device (e.g., a motor, another coil, etc.) based on a recent sequence of start and stop commands selected via start and ES switches.

The output is designed to either provide power to, or cut power off from, the device based on operation of the safety relay circuit. To this end, an output typically includes two or more relay contacts (hereinafter "output contacts") in series between a driving voltage source and the device, each of the output contacts having to be closed to provide power to the device.

The safety relay circuit is designed such that, when the start switch is closed, the relay coils are energized causing the output contacts to close (thereby providing power to the device). The ES switches are arranged such that when the ES switches are opened, coil current is cut off and all properly operating contacts associated therewith change state (i.e., closed contacts open and open contacts close). Thus, when the ES switches are open the output contacts open and power to the motor is cut off. After power is cut off, assuming properly operating contacts, power can again be provided by closing the start switch.

Referring still to FIG. 2, among other things, system 50 includes a safety relay circuit which includes a start button or switch 78, and an ES switch 80 and first and second relay configurations 76A and 76B, respectively. Switches 78 and 80 are linked to second configuration 76B. When the proper sequence of switches 78 and 80 is performed, output contacts associated with configuration 76B are all closed.

With respect to a first safety relay configuration 76A, although not illustrated, the first configuration includes circuitry which monitors the integrity of cables which link remote lock-out switches to the safety relay control circuitry. To this end, the first safety relay configuration includes two relays which are arranged in a manner similar to the configuration described above. In FIG. 2, output contacts corresponding to first safety relay configuration 76A are collectively specified by box 72. Output contacts corresponding to the first relay in the first configuration are identified by references IK1-m where m indicates a relay specific contact (i.e. m=1, 2 or 3) while contacts corresponding to the second relay in the first configuration 76A are each identified by references 1K2-m where m again specifies a relay specific contact. Thus, each of the relays in the first safety relay configuration 76A include six NO contacts in box 72.

With respect to second safety relay configuration 76B, although not illustrated, the second configuration includes circuitry which monitors switches 78 and 80 to determine when power should be provided to and cut off from hazard 52. Essentially second configuration 76B facilitates starting and emergency stop functions. To this end the second safety relay configuration 76B also includes two relays arranged in a manner similar to the configuration described above. In FIG. 2, the output contacts corresponding to second safety relay configuration 76B are collectively specified by box 74. Output contacts 2K1 and 2K2 in box 74 correspond to the first and second relays in the second relay configuration 76B, respectively (i.e. each of the second configuration relays only include a single NO output contact).

Referring still to FIG. 2, generally, the components of system 50 form a control configuration, a controller for controlling the control configuration and a grounding configuration. In addition to the contacts in safety relay boxes 72 and 74, the control configuration includes first and second isolation contactors and a control relay. A contactor is similar to a relay in that it has some combination of related NO and NC contacts and a coil. The difference between a relay and a contactor is that the contactor is designed to handle power while the relay is designed to handle logic level signals. The first isolation contactor includes four NO contacts IK1-1, IK1-2, IK1-3, and IK1-4, one NC contact IK1-5, and a first isolation coil I-1. Similarly, the second isolation relay includes three NO contacts IK2-1, IK2-2 and IK2-3, one NC contact IK2-4, and a second isolation coil I-2. The control relay includes one NO contact CR-1, two NC contacts CR-2 and CR-3 and a control relay coil CR.

The grounding configuration includes a ground contactor and a ground control relay. The ground contactor includes four NO contacts G-1, G-2, G-3 and G-4, one NC contact G-5, and a ground coil G. The ground control relay includes a single NO contact GC-1, and a ground control coil GC.

In addition to safety relay circuits 76 and switches 78 and 80, the controller includes remote lockout switches and system isolation indicators. Referring to FIG. 5, because line 300 includes ten stations, ten RLSs and corresponding indicators are provided. Nevertheless, referring to FIG. 2, to simplify this explanation only three RLSs, RLS1, RLS2 and RLS3, are illustrated along with corresponding indicators 90, 92 and 94. Indicators 90, 92 and 94 are preferably lights. In addition to the components described above, system 50 also includes a current limiting power supply 65, fuses 95, 96 and 97 and a transformer 66.

Referring still to FIG. 2, the above-described components are linked together as follows. A first isolation contactor contact IK1-1 is linked in series with a second isolation contactor contact IK2-1 and fuse 95 between voltage line L1 and node 60. Similarly, fuse 96 and contacts IK1-2 and IK2-2 are linked in series between line L2 and node 62 while fuse 97 and contacts IK1-3 and IK2-3 are linked in series between line L3 and node 64. Hereinafter, contacts IK1-1, IK1-2, IK1-3, IK2-1, IK2-2 and IK2-3 will be referred to generally and collectively as “line contacts.”

Ground contacts G-1, G-2 and G-3 are linked between intermediate nodes 60, 62 and 64, respectively, and a grounding node 100. Grounding node 100 is linked via an equipment grounding conductor (EGC) to ground. Ground control coil GC is linked between ground node 100 and line L3.

Transformer 66 includes a primary winding linked between lines L1 and L2 and a secondary winding which is linked between a ground rail 68 and a voltage rail 70.

First isolation coil I-1 is linked in series with a plurality of contacts between rails 68 and 70. Specifically, coil I-1 is linked in series with NO control relay contact CR-1, first safety relay configuration contacts 1K1-1 and 1K2-1, second safety relay configuration contacts 2K1 and 2K2, and NC ground contact G-5. One intermediate node 102 exists between boxes 72 and 74, and another intermediate node 104 is provided between first intermediate coil I-1 and contact G-5. Coil I-2 is linked in series with contact IK1-4 and contacts 1K1-2 and 1K2-2 corresponding to the first safety relay configuration 76A between intermediate nodes 102 and 104. Thus, coil I-2, like coil I-1, is in series with a plurality of contacts between rails 68 and 70.

First safety relay configuration output contacts 1K1-3 and 1K2-3 form a parallel contact pair and the pair is in series with control relay coil CR between rails 68 and 70. Ground coil G is in series with contacts IK2-4, IK1-5 and CR-2 between rails 68 and 70.

Current limiting power supply 65 is linked to rails 68 and 70 and provides current limited rails to the controller components including a ground rail 110 and a voltage rail 112. An intermediate rail between rails 110 and 112 is identified by numeral 114.

Each of the remote lockout switches RLS1, RLS2 and RLS3 are similarly configured and operate in a similar manner and therefore only switch RLS1 will be explained here in detail. Switch RLS1 includes a pair of contacts 117 and 118 and another contact 116, pair 117 and 118 mutually exclusive with respect to contact 116 (i.e., when contact 116 is closed contact pair 117 and 118 is open and vice versa).

Each contact 116, 117 and 118 forms an open circuit and includes a closing member 120, 121, 122, respectively, for closing the corresponding open circuit. As illustrated, member 120 closes its corresponding circuit while members 121 and 122 open their corresponding circuits. Switch RLS1 is capable of two mutually exclusive states, including an ON state and an OFF state. Switch RLS1 is illustrated in the OFF state wherein member 120 closes contact 116 and members 121 and 122 form open circuits at contacts 117 and 118. In the alternative, when switch RLS1 is ON, member 120 forms an open circuit at contact 116 while members 121 and 122 close contacts 117 and 118.

Switch RLS2 includes a contact pair 131 and 132 and another contact 130 while switch RLS3 includes contact pair 135 and 136 and another contact 134. Contacts 118, 132 and 136 are linked in series between first safety relay configuration 76A terminals which must be shorted in order for configuration 76A to close corresponding contacts in box 72. Similarly, contacts 117, 131 and 135 are linked in series between a second pair of first safety relay configuration terminals which also must be shorted in order for configuration 76A to close corresponding contacts in box 72. Thus, when each of contacts 117, 118, 131, 132, 135 and 136 are closed, if all of the first safety relay configuration contacts operate properly, each of the first safety relay configuration contacts (i.e., the contacts in box 72) close.

Each of RLSs RLS1, RLS2 and RLS3 is a lock-out/tag-out switch which, upon being opened can be locked out and tagged out in a conventional manner.

First contact 116 is linked in series with indicator 90 between rails 110 and 114. Similarly, contact 130 is linked in series with indicator 92 between rails 110 and 114 while contact 134 is linked in series with indicator 94 between rails 110 and 114. Contacts CR-3, GC-1 and G-4 are linked in series between rail 112 and intermediate rail 114.

Referring still to FIG. 2, preferably ground coil G is mechanically linked to isolation coils I-1 and I-2 such that ground coil G cannot alter the states of corresponding contacts (i.e., G-1, G-2, etc.) while either of coils I-1 or I-2 or both I-1 and I-2 are altering states of their corresponding contacts. In other words contactor G and contactors I-1 and I-2 are mutually exclusive.

Operation

Referring still to FIG. 2, in operation, with each of switches RLS1, RLS2 and RLS3 in their ON positions such that contacts 117, 118, 131, 132, 135 and 136 are closed and first contacts 116, 130 and 134 are open, when switches 78 and 80 are manipulated by an operator in an effort to provide power to hazard 52, all of the safety relay output contacts (i.e. contacts in boxes 72 and 74) are closed. In this case, control relay coil CR is energized such that control relay contact CR-1 is closed and contacts CR-2 and CR-3 are both open. Thus, all of the contacts in series with coils I-1 and I-2 are closed and each of coils I-1 and I-2 are energized. As current flows through coils I-1 and I-2, all of the line contacts (i.e., IK1-1, IK1-2, IK1-3, IK2-1, IK2-2 and IK2-3) close and power is provided to hazard 52 (i.e., referring also to FIG. 5, power is provided to VFD 438 and controls 430 to drive motor 421 and each of stations 402 through 420). In addition, isolation contacts IK2-4 and IK1-5 are both open when coils I-1 and I-2 are energized.

Moreover, because each of the contacts IK2-4, IK1-5 and CR-2 is open, ground coil G is not energized and therefore ground contacts G-1, G-2, G-3 and G-4 remain open while contact G-5 remains closed. If the EGC is actually grounded, voltage is applied across ground control coil GC and therefore contact GC-1 is closed.

Furthermore, because each of contacts CR-3 and G-4 is open and each of contacts 116, 130 and 134 is open, none of indicator lights 90, 92 and 94 are lit.

Next, it will be assumed that the process at the exemplary riveting station (i.e., 402 in FIG. 5) malfunctions during system operation. It will also be assumed that switch RLS1 and indicator light 90 are associated with station 402. To this end, switch RLS1 and light 90 are located proximate riveting station 402.

When the process malfunctions, an operator turns off the drive which controls the process. Prior to entering the station, the operator must first verify electrical isolation of that station (i.e., no power is being provided to any of the devices which together constitute the station). To verify electrical isolation of the station, the operator switches switch RLS1 from the ON position to the OFF position as illustrated in FIG. 2. When switch RLS1 is turned OFF, member 120 closes contact 116 while members 121 and 122 open contacts 117 and 118. When members 121 and 122 open contacts 117 and 118, first safety relay configuration 76A causes each of the output contacts in box 72 to open. When contacts 1K1-1, 1K1-2, 1K1-3, 1K2-1, 1K2-2 and 1K2-3 open, voltage is cut off from each of coils I-1, I-2 and CR.

When voltage is cut off from coils I-1 and I-2, ideally each of the line contacts IK1-1, IK1-2, IK1-3, IK2-1, IK2-2 and IK2-3 is opened thereby cutting off power to nodes 60, 62 and 64. In addition, when voltage is cut off from coils I-1, I-2 and CR, contacts IK2-4, IK1-5 and CR-2 all close (i.e., each of those contacts is a NC contact) and ground coil G is energized. When ground coil G is energized, contacts G-1, G-2, G-3 and G-4 all close and contact G-5 opens. When contact G-5 opens, an additional open circuit is provided in series with coils I1 and I2 to ensure power is cut off from nodes 60, 62 and 64. When contacts G-1, G-2 and G-3 are closed, each of intermediate nodes 60, 62 and 64 is linked to ground node 100. Thus, if ground node 100 is actually linked to ground, no power can be applied to nodes 60, 62 and 64.

Referring still to FIG. 2, when node 100 is actually grounded, voltage is still applied across ground control coil GC and therefore contact GC-1 remains closed. However, if node 100 should, for any reason (e.g., contact with an inadvertent power cable) be ungrounded, current is cut off from coil GC and contact GC-1 opens. Thus, after RLS1 is turned OFF, if all of the relays are working properly to ground nodes 60, 62 and 64 and if node 100 is actually grounded, each of contacts CR-3, GC-1 and G4 are closed. In addition, because member 120 is closed across contact 116, voltage is provided between rails 110 and 112 which illuminates indicator 90. Therefore, indicator 90 lights up indicating that it is safe for the operator to enter the station to service the malfunctioning process. Similar operation occurs when either of switches RLS2 or RLS3 are turned OFF. Prior to entering station 402 through an access point, switch RLS1 is locked out and tagged out to ensure safety. Illumination of light 90 verifies a locked out condition.

Industry accidents sometimes occur which could result in an inadvertent short circuit of the control wiring to the switches RLS1, RLS2 and RLS3 of safety relay circuit 76A. For example, crushing the wires could result in a short across contacts 118, 132 and 136. Nevertheless, series contacts 117, 131 and 135 provide a redundancy such that, even if contacts 118, 132 and 136 are shorted, configuration 76A will still operate to isolate hazard 52 and prevent the system isolation light from coming on when any one of switches 116, 130 or 134 is turned OFF and the resetting of the contactors is prevented.

It should be appreciated that while the configuration of FIG. 2 is a preferred embodiment which is advantageous because of its simple, relatively inexpensive and exceedingly robust design, the invention contemplates a relatively broad method which is independent of the hardware configuration used to facilitate the method. To this end, referring to FIG. 3, an exemplary method according to the present invention is illustrated. Although not illustrated, it is contemplated that a processor could perform the inventive method and, and in this regard, one embodiment of an exemplary processor is system 50 (see FIG. 2).

Figure 3:
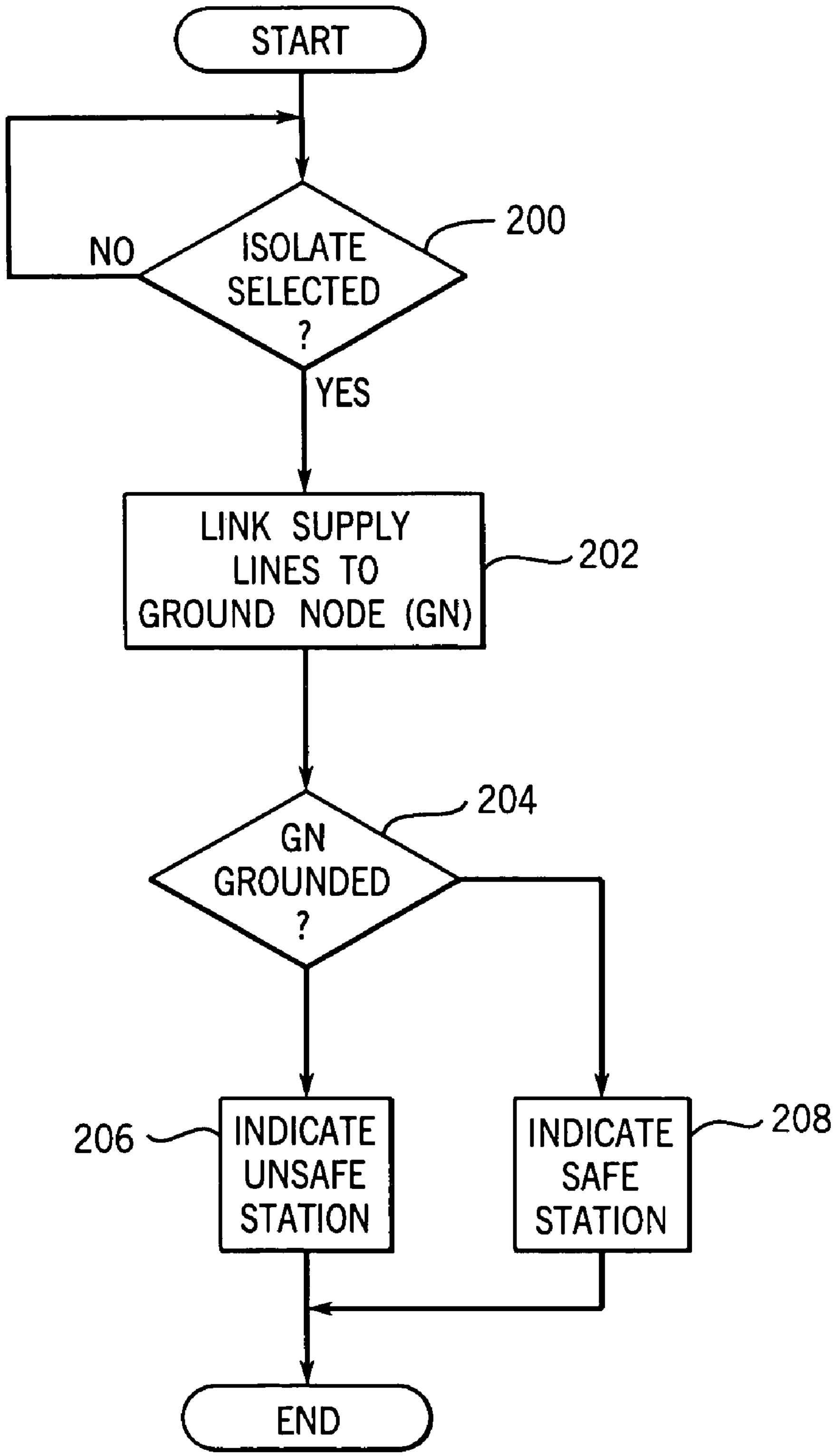
FIG. 3 is a flow chart illustrating a preferred method according to the present invention.

Referring still to FIG. 3, at decision block 200 the processor determines if an operator has selected a station for electrical isolation. If the station has not been selected for isolation, the processor enters a monitoring loop until selection is identified. Where electrical isolation has been selected, at process block 202 the processor links the motion bus nodes 60, 62 and 64 (see FIG. 2 again) to ground node 100.

At decision block 204 the processor determines if ground node 100 is actually grounded (i.e., in FIG. 2 this is accomplished by coil GC and contact GC-1). If node 100 is not grounded, at block 206 the processor indicates an unsafe condition (e.g., will not light up a "system isolated" light). If node 100 is grounded, at block 208, the processor indicates a safe station (e.g., will light up a "system isolated" light).

It should be understood that the methods and apparatuses described above are only exemplary and do not limit the scope of the invention, and that various modifications could be made by those skilled in the art that would fall under the scope of the invention. For example, while the preferred method includes some mechanism for determining if a grounding node is actually grounded, the invention contemplates systems and methods which do not include this feature.

In addition, the preferred system 50 (see FIG. 2) may be configured in many other ways. For instance, the safety relay output contacts may be differently configured to include fewer or more redundancies.

To apprise the public of the scope of this invention, the following claims are made:

What is claimed is:

1. A safety switching assembly for linking voltage lines to device input nodes and for selectively and remotely electrically isolating the device, the apparatus comprising:

- a control configuration for selectively linking and delinking the voltage lines to and from the device, respectively;
- a controller for controlling the control configuration; and
- a grounding configuration for, when the voltage lines are delinked from the device, linking the input nodes to ground,
- wherein the control configuration includes an isolation contactor including one normally open (NO) isolation contact for each voltage line and including an isolation coil, each isolation contact linking an associated line to a separate intermediate node adjacent the device, the controller controlling provision of current to the isolation coil.

2. The apparatus of claim 1 wherein the isolation contactor also includes one normally closed (NC) isolation contact and wherein the grounding configuration includes one NO ground contact for each line and a ground coil, each ground contact linking a separate one of the intermediate nodes to ground, the ground coil in series with the NC isolation contact and a power source.

3. The apparatus of claim 2 wherein the controller includes at least one safety contact in series with the isolation coil and a switch for opening and closing the safety contact.

4. The apparatus of claim 3 further including an indicator in series with the switch which, when current passes therethrough, indicates current flow.

5. The apparatus of claim 4 wherein the indicator is a light.

6. The apparatus of claim 4 further including an additional NO ground contact in series with the switch and the indicator.

7. The apparatus of claim 6 further including a ground conductor linked between ground and a grounding node, each ground contact linked to the grounding node, a ground control relay including a ground control coil and a NO ground control contact, the ground control coil linked between the grounding node and one of the voltage lines, the ground control contact linked in series with the switch, the indicator and the ground contact in series with a power source.

8. The apparatus of claim 2 further including a ground conductor linked between ground and a grounding node, each ground contact linked to the grounding node, a ground control relay including a ground control coil and a NO ground control contact, the ground control coil linked between the grounding node and one of the voltage lines, the ground control contact linked in series with a power source.

9. The apparatus of claim 3 wherein the safety contact is a first safety contact, the apparatus further including a second NO safety contact which is also controlled by the switch, a control relay including a first NO control relay contact and a control relay coil, the first and second safety contacts forming a parallel contact pair, the pair in series with the control relay and a power source.

10. The apparatus of claim 9 wherein the control relay contact is in series with the isolation coil and a power source.

11. The apparatus of claim 10 wherein the control relay further includes a first NC control relay contact in series with the ground coil.

12. The apparatus of claim 9 wherein the control relay further includes a second NC control relay contact in series with the switch.

13. The apparatus of claim 9 wherein the control relay contact is in series with the ground coil.

14. The apparatus of claim 9 wherein the control relay contact is in series with the switch.

15. The apparatus of claim 2 wherein the isolation contacts are first isolation contacts and the apparatus further includes a second isolation contactor including a separate NO second isolation contact for each voltage line and a second isolation coil, each second isolation contact in series with a separate one of the first isolation contacts, the control circuit also for controlling current to the second isolation coil.

16. The apparatus of claim 2 wherein the ground coil is mechanically linked to the isolation coil such that closure of the ground coil and the isolation coil are mutually exclusive.

17. A safety switching apparatus for linking voltage lines to a device and for selectively and remotely electrically isolating the device, the apparatus comprising:

- first and second voltage rails;
- an isolation contactor including one normally open (NO) isolation contact for each voltage line and including an isolation coil, each isolation contact linking an associated line to a separate intermediate node adjacent the device, the isolation contactor also including one normally closed (NC) isolation contact;

at least one safety contact in series with the isolation coil between the rails;

a control circuit for controlling the at least one safety contact;

a ground contactor including one NO ground contact for each line and including a ground coil, each ground contact linking a separate one of the intermediate nodes to ground, the ground coil in series with the NC isolation contact between the rails; and a switch linked to the control circuit for closing and opening the safety contact.

18. A safety switching system for use with a manufacturing line which includes a plurality of stations, the plurality of stations linkable to voltage supply lines at input nodes, each station having an access, the system for remotely facilitating electronic isolation of the plurality of stations and for indicating said isolation on an access by access basis, the system comprising:

a control configuration for selectively linking and delinking the voltage lines to and from the plurality of stations, respectively;

a grounding configuration for, when the voltage lines are delinked from the plurality of stations, linking the input nodes to ground;

a switch for each access that is positioned proximate each access, each switch positionable in at least a first position wherein the switch causes the control configuration to link the voltage lines to the plurality of stations and a second configuration wherein the switch causes the control configuration to delink the voltage lines from the plurality of stations; and an indicator for each access that is positioned proximate each access, each indicator indicating electrical isolation of a corresponding station when a switch associated with the corresponding station is in the second position and the lines are grounded.

* * * * *